United States Patent [19]

Thomas

[11] 4,005,640
[45] Feb. 1, 1977

[54] POWER BOOST MECHANISM
[75] Inventor: Alfred William Thomas, Saarbrucken, Germany
[73] Assignee: Deutsche Bendix Ausrustungs GmbH, Germany
[22] Filed: Nov. 7, 1975
[21] Appl. No.: 630,115
[52] U.S. Cl. .................................. 91/460; 91/391 R
[51] Int. Cl.[2] ................ F15B 13/042; F15B 17/02
[58] Field of Search .................. 91/391 R, 460, 280, 91/5; 60/548, 582

[56] References Cited
UNITED STATES PATENTS

| | | | |
|---|---|---|---|
| 3,633,363 | 1/1972 | Larsen | 91/6 X |
| 3,831,491 | 8/1974 | Thomas | 91/391 R |
| 3,838,629 | 10/1974 | Meyers | 91/460 X |
| 3,915,066 | 10/1975 | Thomas et al. | 91/391 R |
| 3,921,502 | 11/1975 | Lauer et al. | 91/391 R |

Primary Examiner—Irwin C. Cohen
Attorney, Agent, or Firm—Paul David Schoenle; Ken C. Decker

[57] ABSTRACT

A hydraulic booster is disclosed which includes a piston which is actuated by fluid pressure communicated into the booster working chamber from an accumulator by a spool valve. An operator actuated input rod generates fluid pressure in a control chamber when the booster is actuated. The pressure generated in the control chamber shifts the spool valve to a position admitting fluid pressure in the working chamber. An exhaust passage including a relief valve communicates said accumulator chamber with said control chamber. The accumulator includes a piston adapted to bias the relief valve into its open position when the fluid pressure level in the accumulator chamber is below a predetermined value.

6 Claims, 1 Drawing Figure

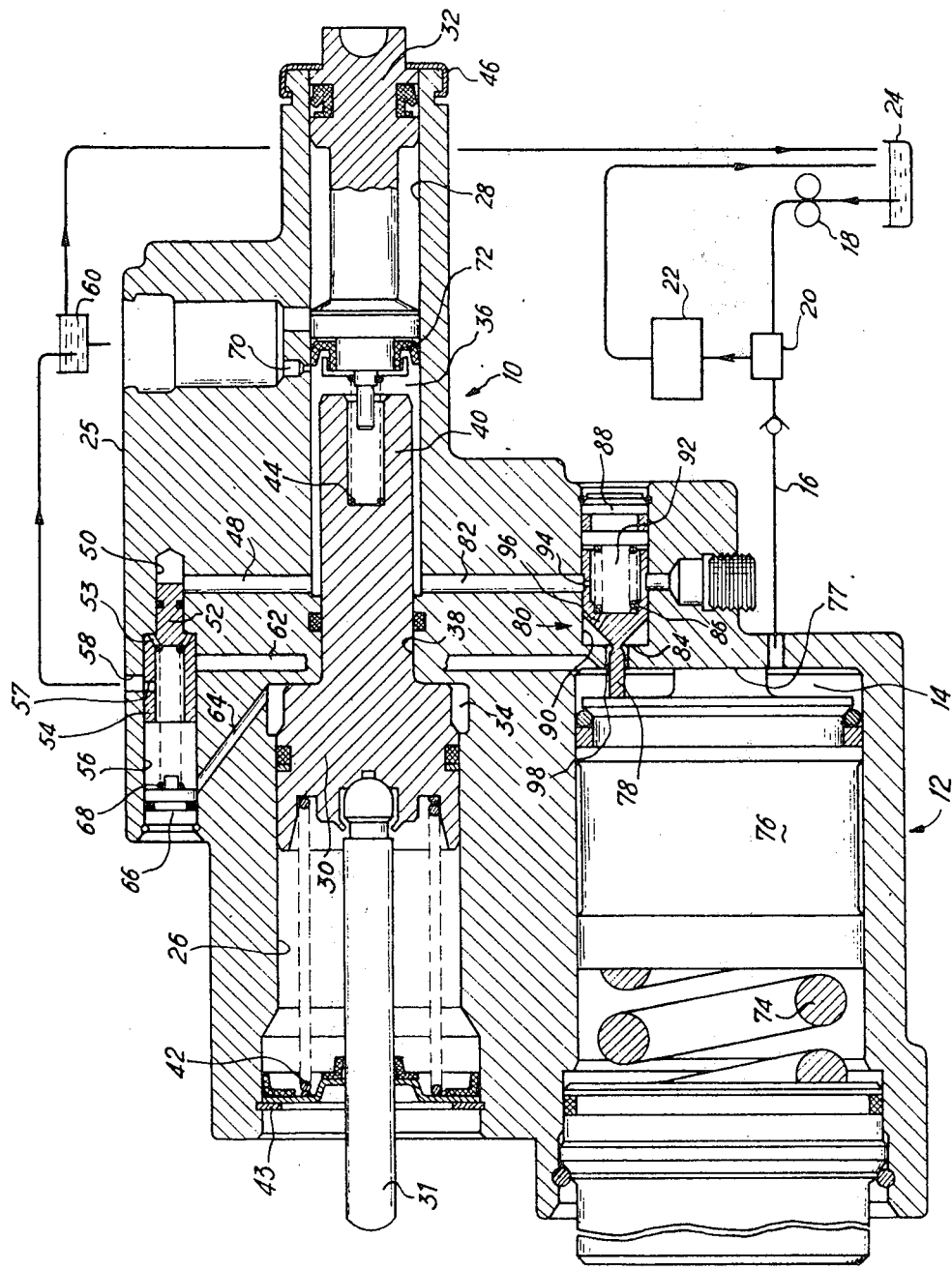

POWER BOOST MECHANISM

This invention relates to a power boost mechanism especially adapted for use in a braking system of a motor vehicle.

There were already proposed hydraulic power boost mechanism including a housing defining a working chamber and a control chamber filled with incompressible fluid, control valve means responsive to the fluid pressure level in said control chamber to shift from a released position venting said working chamber and to communicate successively higher hydraulic pressure levels from an accumulator chamber into said working chamber as said valve means is shifted from said released position, a piston slidably received within said working chamber, an output plunger operatively connected to said piston and slidably received within said control chamber, operator-actuated means including an input plunger slidably received within said control chamber.

One power boost mechanism of this type which was disclosed in the U.S. Pat. No. 3,831,491 uses a control valve comprising a non-return valve. This non-return valve allows a gradual change-over from a hydraulic to a mechanical connection between the input plunger and the output plunger, when this becomes necessary due to the failure of pressure in the working chamber or through operator-actuation beyond the power run-out i.e. beyond the maximum boost pressure available from the pressure source. It effects therefor a change in the apparent pedal ratio i.e. the ratio of the strokes of the input and output plungers.

As explained in the above referenced patent application by allowing fluid to escape from the control chamber in case of pressure failure substantial advantages are obtained among which the change in the pedal ratio and the corresponding gain in the force transmittal from the driver to the brake master-cylinder is one of the most important. But allowing fluid to escape from the control chamber in case of power run-out some drawbacks which are detailed as it follows : After operation through power run out, during the return stroke of the brake pedal, a sudden increase in the reaction force on the input plunger is experienced since the pressure in the working chamber decreases rapidely because the control valve returns to its rest position due to the quick relief of pressure in the control chamber which occurs when a volume of fluid has been previously expelled therefrom.

Usually in motor vehicles the accumulator is loaded by the power-steering pump and under normal operation the run-out point which depends essentially on the characteristics of the pump, is chosen well above the wheel-lock pressure of the vehicle braking system so that this sudden increase in pedal effort is only apparent as a result of a panic braking with a strong pedal effort and then only if the pedal after such an operation, is backed off slowly and not when it is quickly released. Moreover, permitting flow or fluid from the control chamber beyond the run-out point induces feeling of insecurity in the driver during the time wherein the input plunger travels to engage the output plunger. On such occasion the brake pedal partially collapses and the operator may imagine, falsely, that the braking system of his vehicle is out of order.

It is the object of this invention to provide simple reliable means to detect when a pressure failure has occured and to use this same means to cancel stroke amplification so that the effective pedal ratio is increased reducing the pedal force necessary to achieve a given deceleration.

The invention proposes to achieve this object by means of a power boost mechanism as hereinabove defined wherein control chamber communicates with said accumulator chamber by an exhaust passage including a relief valve normally allowing fluid to flow from the accumulator chamber towards the chamber and means for maintaining said relief valve into its open position when the pressure in the accumulator chamber is below a predetermined level.

By way of example the predetermined level is chosen to be 100 PSI or 7 kg/cm2 thereby avoiding undesirable opening of the relief valve whenever a reserve pressure that could be useful for assistance exists in the accumulator.

One embodiment of the invention is now described with reference to the drawing in which the sole FIGURE represents a power boost mechanism according to the invention for a motor vehicle hydraulic brake system in a schematic, sectional view.

In the embodiment shown in the FIGURE the power boost mechanism 10 receives fluid pressure from an accumulator 12 whose chamber is connected through line 16 to a power steering system. The hydraulic power steering system essentially includes a pump 18, an accumulator charging valve 20 of any known type, a power steering mechanism 22 including a valve of the open-center type and a fluid reservoir 24. The power boost mechanism includes a housing 25 provided with two coaxial bores 26, 28 in which are sealingly mounted a boost piston 30 and an operator-actuated input plunger 32 respectively to define therein a working chamber 34 and a control chamber 36. The piston 30 is adapted to actuate through the intermediary of push rod 31 a conventional vehicle brake master-cylinder (not shown) secured to the power boost housing. The bores 26 and 28 are separated by a wall provided with an aperture 38 in to which projects an output plunger 40 integral with the piston 30. It should be noted that the ratio of the cross-sectional areas of output plunger/input plunger is below unity. A return spring 42 acting on a spring clip 43 secured to the housing biases the piston 30 in its rest abutting position shown in the FIGURE, whereas another spring 44 stressed between the output and input plungers biases the latter into its rest position in abutment with a stop ring 46 fixed to the housing. The control chamber 36 communicates through a duct 48 with a cavity 50 into which projects a piston forming element 52 integral with a spool valve 54 controlling the pressurization of the working chamber 34. The spool valve 54 is slidably mounted in a bore 56 of the housing in which opens a port 58 leading to reservoir 24 through a fluid retaining vessel 60, a duct 62 leading to the chamber 14 of the accumulator, and a duct 64 leading to the working chamber 34. The bore 56 is closed by a plug 66 on which acts a spring 68 biasing the spool 54 into its shown rest position. The spool valve, which is schematically shown in the FIGURE, is provided with suitable openings 53, 57 permitting if in this rest position to vent the working chamber 34 to the reservoir 24 whereas communication with the accumulator chamber 14 is prevented. Finally the control chamber 36 is refilled from the vessel 60 through a conventional master-cylinder refill orifice 70 which cooperates with a seal cup 72 mounted on the input plunger.

The hydraulic accumulator shown which presents an housing integral with the power boost one is of the spring type but could be gas-loaded. A heavy spring 74 biases an accumulator piston 76 in abutment against the end wall 77 of the chamber 14. In the position shown in the figure, the piston 76 engages a projection 78 of a relief valve 80 located in a bore 90 connected by an exhaust passage 82 communicating the accumulator chamber 14 to the control chamber 36. The valve 80 is urged towards its seat 84 by a spring 86 acting on a plug 88 closing a bore 90 in which is located the relief valve 80. In the particular embodiment of the invention shown in the FIGURE the valve 80 is cup-shaped and is slidably mounted in bore 90 to define therewithin a cavity 92 which communicates with the control chamber 36 through a first restrictor 94 and with the accumulator chamber 14 through a second restrictor 96 and the valve seat 84 and a third restrictor 98 defined between the wall of the valve seat and the projection 78. In this particular embodiment the effective areas of the restrictors 94 and 96 are equal but notably reduced with respect to the one of the refill orifice 70, such as the one of restrictor 98.

The operation of the power boost mechanism just described is as follows: Assuming that the pressure in the accumulator chamber 14 is above a predetermined level chosen about 100 PSI or 7 kg/cm2, the relief valve 80 is closed since the piston 76 is disengaged from the end wall 77 and the threshold value of the pressure difference across the relief valve 80 required to hold it open is much higher tentatively 1000 PSI or 70kg/cm2. It should be pointed out that the relief valve 80 acts as a conventional safety valve normally provided in spring loaded accumulator. In effect if due to thermal expansion pressure in the accumulator chamber 14 increases dangerously the valve 80 unseats and there occurs a small leakage of fluid to the reservoir through the restrictors 98, 96 and 94, the exhaust passage 82, the control chamber 36 and the refill orifice 70.

Upon actuation by the driver of the input plunger 32, the control chamber 36 is separated from vessel 60. Further unward displacement of input plunger 32 tends to compress fluid in the control chamber 36 and as the control pressure increases above tentatively 43 PSI or 3kg/cm2 the spool valve 54 is operated. The venting of the working chamber 34 is thereby terminated and pressurized hydraulic fluid flows through the duct 62, the orifices 53 and the duct 64 into working chamber 34. The working pressure reacts on plunger 52 of the spool valve 54 so that, up to the run-out point, the control and the working pressures are substantially equal. The input/output plunger strokes ratio is below unity, about 0.7 in the shown embodiment. In the case wherein the driver strongly depresses the brake pedal the control pressure is above the run-out pressure available from the pump 18. A sudden increase in pedal stroke occurs during application and no sudden increase in pedal force during the return stroke since the fluid is maintained trapped in the control chamber 36.

Assuming now that the pump 18 fails and that consequently the accumulator pressure falls below predetermined level of 100 PSI or 7kg/cm2, the heavy loaded spring 74 overcomes the valve spring 86 thereby opening the relief valve 80. An input plunger stroke causes movement of the spool valve 54 and as previously described fluid can flow from the control chamber 36 into working chamber 34, and tends to displace piston 30. However no substantial pressure can be created in the working chamber 34 since after a short input stroke the input plunger engages the output plunger and the brakes are mechanically actuated, the input/output stroke ratio being now equal to unity.

During the charging operation of the accumulator and as long as the relief valve 80 is open there occurs a fluid leakage therethrough towards the vessel 60 and which may present a substantial flow. The purpose of the three restrictors 94, 96 and 98 is to create sufficient pressure drops to prevent a pressure rise in the control chamber 36 which would be higher than 21 PSI or 1.5kg/cm2 thereby avoiding any movement of spool valve 54 or piston 30. To this end the diameters of the restrictors are chosen taking into consideration that of the refill orifice 70 so that in the event an accumulator pressure of 100 PSI or 7kg/cm2 there appears across each restrictor 94, 96 and 98 a pressure drop tentatively about 28 PSI or 2kg/cm2.

One should notice that the design of the embodiment of the invention appears simple with respect to the advantages obtained and that the provision of the relief valve avoids the provision of a bleeding-screw for the control chamber 36 since this chamber may be initially filled with fluid flowing from the accumulator chamber 14. The invention is not limited to a power boost mechanism exclusively operated from accumulator pressure. In another embodiment (not shown) of the invention the control valve operates as an open-center valve rather than as a closed-center valve. In such a circuit a normal operation of control valve restricts the fluid flow from the pump to the steering mechanism thereby creating pressure in the working chamber whereas operation of the steering mechanism or the brakes creates a back pressure permitting the accumulator to be charged. Assuming that the steering pump fails a further displacement of the control valve communicates the accumulator chamber to the working chamber. Such open center control valve is described in U.S. Pat. No. 3,638,528.

What is claimed is:

1. A power boost mechanism including a housing defining a working chamber and a control chamber filled with fluid, a fluid pressure accumulator having a pressure responsive element and a chamber filled with fluid for providing pressure fluid for operation of said power boost mechanism, control valve means responsive to the fluid pressure level in said control chamber to shift from a released position venting said working chamber to a position communicating pressure from the accumulator chamber into said working chamber as said control valve means is shifted from said released position, a piston slidably received within said working chamber, an output plunger operatively connected to said piston and slidably received within said control chamber, operator-actuated means including an input plunger slidably received within said control chamber, said control chamber communicating with said accumulator chamber by means of an exhaust passage including a spring biased relief valve allowing hydraulic fluid to flow from the accumulator chamber towards the control chamber when the pressure differential across said relief valve is above a first predetermined level, and said pressure responsive element responsive to the pressure level in the accumulator chamber being engageable with said relief valve to open the same when the pressure in the accumulator chamber is below a predetermined minimum level lower than said first predetermined level.

2. A power boost mechanism according to claim 1, wherein said pressure responsive element is a loaded piston.

3. A power boost mechanism according to claim 1, including a refill orifice communicating said control chamber to a low pressure reservoir, said refill orifice being closed upon actuation of said input plunger, said exhaust passage including flow restricting means, the effective area of said flow restricting means being smaller than that of the refill orifice.

4. A power boost mechanism according to claim 3, wherein said exhaust passage includes a bore, said relief valve being a spring loaded cup-shaped member slidably mounted in said bore to define an intermediate cavity communicating with said control chamber and the accumulator chamber through a flow-restrictor, respectively.

5. A power boost mechanism according to claim 4, wherein said pressure responsive element is a loaded piston, said exhaust passage including a third flow-restrictor defined between the wall of the opening between the bore and the accumulator chamber and a projecting rod secured to the relief valve and extending through said opening to be engaged by said loaded piston.

6. A power boost mechanism according to claim 3, wherein said pressure responsive element is a loaded piston.

* * * * *